Jan. 15, 1963  L. KADLEC  3,074,060
INDICATOR EMPLOYING TORSION BAR SUPPORT
Filed June 7, 1960

INVENTOR.
Ladislav Kadlec
BY
Leonard H. King

United States Patent Office 3,074,060
Patented Jan. 15, 1963

3,074,060
INDICATOR EMPLOYING TORSION BAR SUPPORT
Ladislav Kadlec, Jackson Heights, N.Y., assignor to
Avien, Inc., Woodside, N.Y.
Filed June 7, 1960, Ser. No. 34,424
12 Claims. (Cl. 340—373)

This invention relates to electromagnetic indicating devices which may be mounted for viewing on a panel, dashboard or the like, for the purpose of indicating conditions such as power failure in equipment such as an aircraft electrical system. The invention has particular reference to those devices which employ a rotating member, such as a drum, upon which a legend is printed for indicating conditions such as power failure by the angular position of the rotating member.

It is an object of this invention to provide an improved indicating device of the type described.

It is a further object of this invention to provide a novel suspension for the drum in such a device.

It is a still further object of this invention to provide a unique torsion bar suspension for the drum which will obviate the need for low friction or jewel bearings.

It is another object of this invention to provide a novel and reliable indicating device which is inexpensive and easy to produce while avoiding possible causes of failure.

It is yet another object of the invention to provide an indicating device which is vibration stable and wherein all limit positions are positively restrained.

It is still another object of the invention to provide an indicator of the type described which may be easily adjusted.

The invention provides a drum having an axial opening, a torsion bar mounted at one end and passing through the opening and secured to the drum near the face of the drum away from the mounted end of the torsion bar. The drum member is rotatable against the twisting restraining force of the torsion bar. A diametrically oriented magnetic material is imbedded in the drum member for rotation past the pole pieces of an electromagnet between which the drum member is carried.

The invention further provides means for adjusting the torsion bar so as to pivot the drum member and cause the magnetic material to be urged to an orientation transverse to the diametric direction of the pole pieces. A coil connected to the power source to be measured is included with the electromagnet and serves, when energized, to pivot the drum so as to align the magnetic material with the pole pieces. The drum is thus urged toward one position when the coil is energized and toward another when the coil is de-energized. Limit stops are provided against which the drum abuts prior to reaching the alternative positions toward which it is urged.

The various features of novelty which characterize the invention are pointed out with particularity in the claims; for a clearer understanding of the invention, reference may be had to the following descriptive matter and drawings wherein preferred embodiments of the invention are shown.

Figure 1:
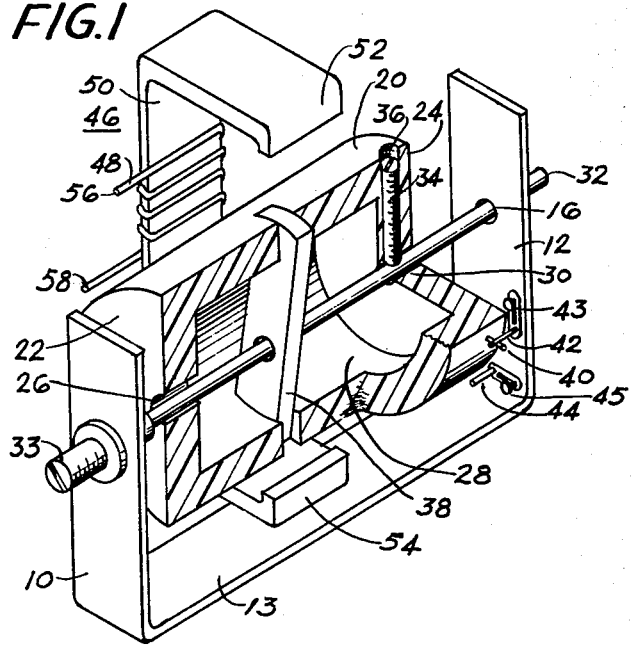
FIG. 1 is a perspective, partially cut away and partially schematic, view of an indicator which embodies the principles of this invention.

Referring now to the drawings wherein like numerals are used throughout the figures for like parts, the construction of the present invention comprises a pair of spaced parallel trunnion plates 10 and 12 which terminate at their lower ends in a base support 13 and which may serve to secure the indicator against a suitable panel for viewing. A drum assembly, generally designated 14, is mounted for rotation between the plates 10 and 12. The drum assembly 14 is comprised of a non-metallic non-magnetic, cylindrical drum 20 provided with a pair of end faces 22 and 24, each of which are spaced from the respective plates 10 and 12. Synthetic resins and glass are preferred materials for drum 20. An axial bore 26, serving as a bearing, extends partially into the drum 20 and is extended by an enlarged axial bore 28 which terminates in a hole 30, which continues to the end face 24. A torsion bar or wire 32, preferably one prepared of spring material, is integral at one end with a torque adjusting screw 33 which projects through threaded bore 18 in plate 10. The torsion wire 32 is received by the hole 30 and penetrates through the bores 26, 28, and the opening 16. A position set screw 34, located in tapped bore 36, extends radially outwardly from the torsion wire 32 and is tightened against the torsion bar 32 to secure the drum 20 thereto.

An actuator bolt 38 of magnetic material such as soft iron, or a permanent magnet, and which is depicted as rectangular in cross-section, although other suitable shapes may be expediently used, is mounted within the drum 20 and passes through the center of the axis of the drum 20. A projection pin 40 radially extending from one end of the drum 20 limits the rotation thereof in one direction by abutting against a stop lug or arm 42 and in the other direction by abutment against a stop lug or arm 44; both of which lugs protrude inwardly from the plate 12.

A stationary electromagnet generally designated 46 includes a suitably mounted coil 48 (shown here schematically), and a C shaped core 50 of low retentivity material such as silicon-steel. A pair of pole pieces 52 and 54 of rectangular cross-section terminate the core at each end and extend inwardly to diametrical positions at the center of the cylindrical length of the drum 20 and near the path of the poles of the actuator bolt 38. The ends of coil 48 are provided with a pair of leads 56 and 58 which are suitably connected to the circuit or source of power to be monitored so as to be subject to current flow. While the trunnion plates 10 and 12 are illustrated in FIG. 1 as being vertically positioned, it will be understood that this is a matter of choice; the trunnion plates may be horizontally positioned as shown in FIGS. 4 to 8.

Figure 4:
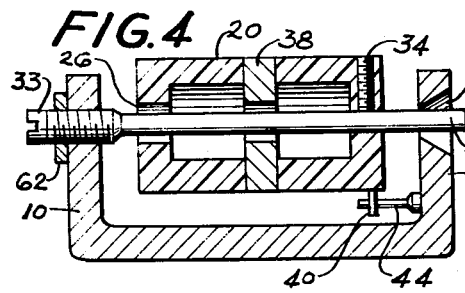
FIG. 4 is a sectional view of the drum of FIG. 1 and the suspension therefor.

FIG. 4 best illustrates the manner in which the drum assembly 14, and in particular the drum 20, is supported for rotation upon the torsion bar 32 between the plates 10 and 12. The torsion bar is secured at the left end by means of the torque adjusting screw 33 which is an extension of the wire 32 and a securing nut 62. The securing nut 62 which by bearing against the plate 10 as a result of the engagement of its threads with the screw, laterally and rotatively fixes the position of the screw 33 as well as the torsion bar 32. The stiffness and dimensions of the torsion bar 32 are advantageously selected so that when the set screw 34 bears against the bar and fastens the drum thereto for rotary motion therewith, the vertical moment transverse to the axis of the bar produced by the weight of the drum 20 will not longitudinally bend the wire sufficiently to cause the drum 20 to rest upon the bar at the bore 26. Thus there has been avoided causes of rubbing friction which in more conventional designs would tend to retard the rotation of drum 20.

Because of ancillary design considerations it may be desired to employ a drum of substantial weight. When the weight of the drum 20 is sufficiently great, with respect to the stiffness of the wire 32, bearing contact will occur between the bore 26 and the bar 32 as well as between the wall of opening 16 and the bar 32. Such an embodiment is within the scope of this invention and is disclosed in FIG. 4A.

Figure 5:
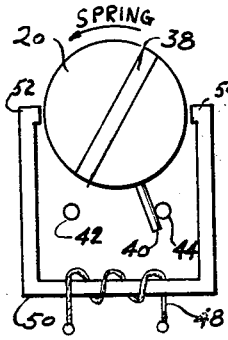
FIGS. 5 and 6 are schematic representations of two positions of an indicator of the non-latching type which embodies this invention.
Figure 6:
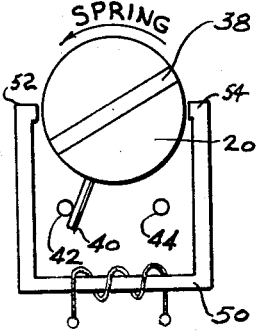

While many methods may conveniently be utilized to adjust the indicator mechanism to a particular position for proper reading thereof, the following method is given as an example. The adjustment is, of course, dependent upon the desired direction of rotation of the drum as it turns between the two predetermined conditions to be indicated thereby. Facing FIG. 1 from the left it will be assumed for convenience that it is desirable that the drum rotate counterclockwise from a power-off to a power-on condition. The power-on condition is depicted in FIG. 1 and is indicative of and corresponds to current flow through the coil 48 in either direction. The set screw 34 may be first loosened so as to permit free rotation of the drum, which is then turned counterclockwise until the projection pin 40 abuts against the lug 44. The set screw may then be tightened, while maintaining the above abutment, by means of a screw driver or like tool. In this condition a direct current flow through the coil 48 will energize the electromagnet core 50, the resulting stray magnetic field of which will attract the nearby hitherto unmagnetized poles of the actuator bolt 38. Further in the power-off condition, before current flows through the coil 48, little or no torsional strain exists upon the torsion bar 32. The energized electromagnetic core 50 which attracts the poles of the now temporarily magnetized actuator bolt 38 causes clockwise rotation of the drum 20 toward alignment of the bolt 38 with the poles 52 and 54 against the torsion of the wire 32, until the projection pin 40 abuts the lug 42. The lug 42 is positioned to arrest rotation prior to alignment of the bolt with the poles so as to serve as a positive stop while the magnetic forces urge the drum 20 toward alignment. FIG. 6 is illustrative of this condition. When current flow through the coil 48 ceases, the torsion bar 32 urges the drum counterclockwise until the projection 40 abuts the lug 44 as shown in FIG. 5.

The torque adjusting screw 33 serves, when turned clockwise, to increase the starting torque required to rotate the drum and avoids rotation of the drum 20 as a result of vibration, stray currents, and/or stray magnetic effects. Adjustment of the screw 33 to urge the drum 20 in a clockwise direction also serves to provide a positive stop by urging abutment of the projection 40 against the lug 44.

It will be noted that the positions of the lugs 42 and 44 relative to the position of the projection pin 40 will affect the operation of indicator in a manner similar to the angle of contact of the set screw upon the torsion bar 32 and the rotation of the starting torque adjusting screw 33. That is, the angle along the periphery of drum 20 from which the projection pin 40 extends when compared with the position of the bolt 38 will in part determine the positions which the lugs 42 and 44 should occupy to perform their function. Normally, the positions of the lugs 42 and 44 are a matter of adjustment which may be accomplished by loosening of set screws 43 and 45 respectively, securing lugs 42 and 44 to the frame 13. The figures exemplify advantageous positions of the lugs.

Figure 2:
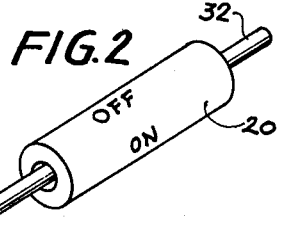
FIG. 2 is a view of the rotor used in FIG. 1 with an appropriate legend printed thereon.
Figure 3:
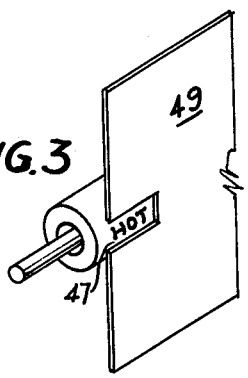
FIG. 3 is a perspective view of a rotor such as may be used in FIG. 1, wherein the legend printed on the face is shown exposed through a panel opening, the panel being shown partially broken away.

Referring to FIG. 2, the drum 20 is illustrated with a sample legend printed thereon. In operation the indicator of FIG. 1 is supported upon a panel 49, or the like, with the drum 20 facing a window 47 in the panel, as shown in FIG. 3, which window may be conveniently provided with a cylindrically concave recess to receive the projecting surface of the drum 20. Alternatively, the drum 20 may be marked on one end face 22 or 24 so as to be conveniently displayed through a suitable window positioned adjacent and parallel to the end face as part of a panel.

Figure 9:
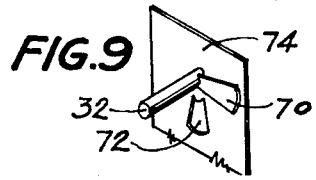
FIG. 9 illustrates another embodiment of the invention showing an alternative means of displaying the position of the drum to an operator.

A further embodiment of the invention is shown in FIG. 9 where a radially extending lightweight sectoral indicator flag 70 is keyed to the bar 32 at its narrow end for rotation along with, or in lieu of, the drum 20. The indicator flag 70 is appropriately divided into colored areas for indication and positioned adjacent a smaller sectoral opening 72 in a panel 74 for convenient viewing of the angular position thereof by an operator. The angular rotation of torsion wire 32 is thus displayed.

Referring to FIG. 4, wherein a cross-sectional view of FIG. 1 clearly depicts the clearances between parts achieved by the invention and the drum 20; drum 20 is shown to be entirely suspended by bar 32.

Figure 4A:
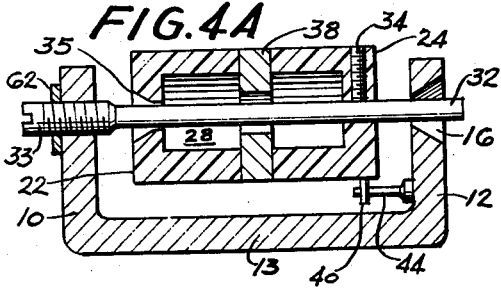
FIG. 4A is a sectional view similar to FIG. 4 wherein a modified drum is shown.

In FIG. 4A there is shown a modification wherein a bearing surface 35 is provided with seats upon member 32. This configuration is employed when an extremely thin torsion bar 32 is utilized in combination with a drum 20 whose weight is sufficient to deflect the bar 20.

FIGS. 5 and 6 illustrate schematically the limit positions of the indicator of FIG. 1 wherein the drum 20 is suitably adapted to indicate whether power is, or is not, being supplied to the equipment to be monitored. While the core 50 of the electromagnet 46 is here oriented with its legs vertical, it will be understood that the electromagnet is substantially identical to that shown in FIG. 1 and that it is the relative positions and movement of the actuator bolt 38 with respect to the core 50 which is of importance in the operation. When the power is off because the system to be measured is not operating or for a similar reason, the torsion bar 32 urges the drum 20 counterclockwise so as to cause the pin 40 to abut the lug 44. Power supplied to the system monitored produces a currrent flow through the coil 48 causing magnetization of the pole pieces 52 and 54 and consequent rotation of the drum 20 against the urging of the wire 32 until the projection pin 40 abuts the lug 42 (see FIG. 6). The drum 20 at this point is still urged to rotate as a result of the attraction by the energized pole pieces 52 and 54, but further movement is prevented by the lug 42 which ends rotation prior to alignment of the bolt 38 with the pole pieces. Power failure or lack of current through coil 48 de-energizes the temporarily magnetizable pole pieces and the actuator bolt, allowing the torsion wire 32 to return the drum to the position of FIG. 5. This action is typical of the non-latching type of indicator.

Figure 7:
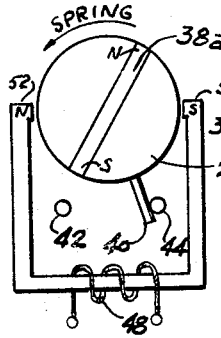
FIGS. 7 and 8 are schematic representations of two positions of an indicator of the latching type which embodies this invention.
Figure 8:
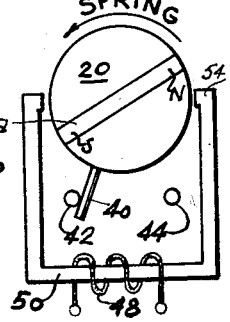

This invention may be embodied in a latching type indicator wherein once current flow has existed within the coil 48 and the drum has been rotated to its "on" or "hot" indicating position, the drum will remain in this position until returned to the "off" or "cold" indicating position, either by mechanical means or a current reversal. Such a system is schematized in FIGS. 7 and 8 where the core 50 is of a temporarily, but not permanently, magnetizable material but the bolt 38a is comprised of a material of high retentivity and permanently magnetized as shown. It should be noted that FIGS. 7 and 8 are merely schematic representations of the indicator of FIG. 1 wherein the material of bolt 38 has been changed. In this case, when no current flows in coil 48, the bolt 38 and the drum 20 will be urged counterclockwise by the torsion bar 32 to the position in FIG. 7. Current flow in coil 48 creates a south pole at the pole piece 54 and induces rotation of the drum 20 as a result of the attraction of the poles of opposite sense. If the current flow ceases, the drum does not return to the former position since the torsion bar is adjusted to exert a lower reversing torque upon the drum than the magnetic attraction induced by the presence of the permanently magnetized poles of bolt 38a near the now non-magnetized pole pieces 52 and 54. Thsis magnetic attraction is sufficient to maintain the position of FIG. 8.

To return the drum 20 to the inactive position shown in FIG. 7, a resetting current of opposite direction is applied to coil 48, thus creating a N pole on pole piece 54 and a S pole on pole piece 52.

It will thus be seen that the invention provides a unique and improved indicator which is capable of being embodied in a non-latching and latching device, which is readily adjustable and which requires no jeweled bearings. In the non-latching embodiment, the reading corresponding to "on" or current flow is indicative of current flow in either direction. In the latching embodiment of this invention, the position corresponding to "hot" or "on" is indicative of current through one predetermined direction.

While specific embodiments of the invention have been shown and described in detail to illustrate the application of the invention principles, it will be understood that the invention may be embodied otherwise, without departing from such principles.

What is claimed is:

1. A current failure indicator comprising an electromagnet having a core which includes a pair of poles positioned so as to face one another, magnetic rotor means positioned between said poles having a pair of ends rotatable from and toward a position wherein said ends are in alignment with said poles, mounting means for said magnetic means secured thereto, said mounting means including a torsion bar extending transverse to the plane of rotation of said magnetic means and fixedly held at one extreme while being secured to said magnetic means at a position spaced from the extreme, so as to support said magnetic means and to urge said magnetic means from the position of alignment with said pole pieces, whereby when current is passed through the coil of said electromagnet, said magnetic means is attracted toward a position of alignment against the urging of said torsion bar, and display means coactive with said magnetic means to indicate the position of said magnetic means with respect to said electromagnet.

2. A device as set forth in claim 1 further comprising stop means connected with said magnetic means and said mounting means, for blocking the movement of said magnetic means, when attracted by said pole pieces, at a position out of non-alignment with said pole pieces; and for blocking the movement from the position of alignment so that said magnetic means is urged against the blocking action of said stop means.

3. A current indicator for visually displaying the presence or absence of electric energy comprising a stationary electromagnet including a coil connected to the energy source to be monitored and a core having a pair of spaced poles, said core being capable of being energized by current flow through said coil, rotor means including an elongated ferrous member positioned so as to be influenced by at least one of the said poles when energized, means for rotatably mounting said rotor means so as to permit rotation of said ferrous member toward and away from the one of said poles by which it is influenced, whereby when said member moves in response to attraction of the one of said poles it moves toward an activated position and toward a released position when moving away from said pole; said mounting means including a support member, a torsion bar fixed at one end to said support member and extending transverse to the plane of rotation of said ferrous member; said torsion bar being fixed to said rotor means at its other end and of sufficient stiffness to support said rotor means, said torsion bar being secured to said rotor means so as to urge said ferrous member toward the released position.

4. An indicator as set forth in claim 3 wherein said rotor means includes a drum and wherein said ferrous member is positioned diametrically within said drum, an axial opening in said drum to receive said torsion bar, and means for releasably securing said torsion bar to said drum near the face of said drum which is remote from the fixed end of said bar.

5. An indicator as in claim 4, wherein said means for securing said torsion bar includes a screw radially extending into said drum for bearing against said torsion bar.

6. An indicator as set forth in claim 5 further comprising a torque adjusting screw integral with said torsion bar for fixing said torsion bar to said support member and for adjustment of the rotary urging force upon said rotor means, and a bearing nut for maintaining the relative positions of said support member and said torsion bar.

7. An indicating device for response to a source of electric energy comprising a temporarily magnetizable stationary core having a pair of opposing pole pieces in which the core terminates, a wire coil surrounding the center portion of said core and adapted to be connected to the source of energy to which the device is to respond, a torsion bar having a stationary stub end and a coaxial wire extending therefrom intermediate said pole pieces, a non-magnetizable drum positioned coaxially around said wire, screw means for securing said drum to said wire at a position adjacent to the end of said wire which is extreme from said stub, display means for rotation with said drum, said drum being shaped along its axis to clear said wire, said screw means being arranged to support said drum on said wire coaxial with said wire, said wire being capable of resisting the transverse bending moment of said drum, and being capable of resilient twisting along its axis, whereby said drum is supported by means of said wire and said screw means, a temporarily magnetizable rod diametrically mounted in said drum in the plane of said core so that said rod may swing past said pole pieces as said drum is rotated against the torsional urging of said wire, said screw means being capable of releasing said drum from said wire so said drum may be rotatably adjusted with respect to said wire, said screw means being adjustable so that said rod on said drum is biased away from alignment with said pole pieces, and so that said bar upon energization of said coil is urged against the bias of said wire toward alignment with said pole pieces.

8. An indicating device for response to a source of electric energy comprising a magnetizable stationary C-shaped core having a pair of opposing pole pieces in which the core terminates, a wire coil surrounding the center portion of said C-shaped core and adapted to be connected to said source of energy, a torsion bar having a stationary stub end and a coaxial wire extension extending between said pole pieces, a non-magnetizable drum having a legend positioned coaxially around said wire, screw means securing said drum to said wire at a position adjacent to the end of said wire which is extreme from said stub, said drum being shaped along its axis to clear said wire, a permanently magnetizable rod diametrically mounted in said drum in the plane of said core said rod being polarized so that upon energization of said coil, said coil is urged against the bias of said wire toward alignment with said pole pieces and means for positively stopping rotation of said drum prior to alignment of said rod with said pole pieces, the magnetization of said rod being sufficient to retain the aligned position of said rod against the torsional effect of said wire after de-energization of said electromagnet.

9. A latching indicating device for response to a source of electric current comprising a magnetizable stationary C-shaped core having a pair of opposing pole pieces in which the core terminates, a wire coil surrounding the center portion of said C-shaped core and adapted to be connected to said source of current, a pair of upstanding parallel mounting plates positioned on alternate sides of said C-shaped core at equal distances from the center point of a line which joins said pole pieces, said plates each having an opening along an axis perpendicular to the plane of said core and passing through the center of the line which joins said pole pieces, internal threads on one of said openings, a torsion bar having a stationary threaded stub end in mating engagement with said threads on said plate and a coaxial wire extending from the threaded opening along the axis of the opening in said plates and clearing through the opening in the other of said plates, a non-magnetizable drum having a legend positioned coaxially around said wire and between said plates, screw means for securing said drum to said wire at a position adjacent to the end of said wire which is extreme from said stub, said drum being shaped along its axis to clear said wire, said screw means being arranged to support said drum on said wire coaxial with said wire, a permanently magnetizable rod diametrically mounted in said drum in the plane of said core so that said rod may swing past said pole pieces as said drum is rotated against the torsional urging of said wire, said stub end being adjustable so as to adjust the untwisted position of said drum and said wire with respect to said pole pieces, a pair of stop pegs mounted on one of said plates, a radial stop pin on said drum positioned for engagement with said stop pegs for positively limiting the rotation of said drum, said screw means and said stub end being adjustable so that said rod on said drum is biased away from alignment with said pole pieces, and against one of said pegs, said bar being polarized so that upon energization of said coil, said coil is urged against the bias of said wire toward alignment with said pole pieces until said pin abuts against the other of said stops, said pin and pegs being positioned so as to stop rotation of said drum prior to alignment, the magnetization of said rod being sufficient to retain the aligned position of said rod against the torsioned effect of said wire after de-energization of said electromagnet.

10. An indicating device for response to a source of electric current comprising a temporarily but not permanently magnetizable stationary C-shaped core having a pair of opposing pole pieces in which the core terminates, a wire coil surrounding the center portion of said C-shaped core and adapted to be connected to the source of current to which the device is to respond, a pair of upstanding parallel mounting plates positioned on alternate sides of said C-shaped core at equal distances from the center point of a line which joins said pole pieces, said plates each having an opening along an axis perpendicular to the plane of said core and passing through the center of the line which joins said pole pieces, internal threads on one of said openings, a torsion bar having a threaded stub end in mating engagement with said threads on said plate and a coaxial wire extending from the threaded opening along the axis of the opening in said plates and clearing through the opening in the other of said plates, a non-magnetizable drum having a legend printed on its face positioned coaxially around said wire and between said plates, screw means for securing said drum to said wire at a position adjacent to the end of said wire which is extreme from said stub, said drum being shaped along its axis to clear said wire, said screw means being arranged to support said drum on said wire coaxial with said wire, said wire being capable of resisting the transverse bending moment of said drum and being capable of resilient twisting along its axis, whereby said drum is supported by the threaded one of said plates by means of said wire and said screw means, a temporarily magnetizable rod diametrically mounted in said drum in the plane of said core so that said rod may swing past said pole pieces as said drum is rotated against the torsional urging of said wire, said stub end being adjustable so as to adjust the unbiased position of said drum and said wire with respect to said pole pieces, said screw means being capable of releasing said drum from said wire so said drum may be rotatably adjusted with respect to said wire, a pair of stop pegs mounted on one of said plates, a radial stop pin on said drum positioned for engagement with said stop pegs for positively limiting the rotation of said drum, said screw means and said stub end being adjustable so that said rod on said drum is biased away from alignment with said pole pieces, and against one of said pegs, and so that said rod upon energization of said coil is urged against the bias of said wire toward alignment with said pole pieces until said pin abuts against the other of said stops, said pin and pegs being positioned so as to stop rotation of said drum prior to alignment.

11. An indicating device as in claim 6 further comprising display means for indicating the angular position of said drum having a spherical surface with a legend printed thereon.

12. An indicating device as in claim 6 further comprising display means for indicating the angular position of said drums and including a flag radially extending from said torsion bar and secured thereto for rotation therewith.

References Cited in the file of this patent

UNITED STATES PATENTS

| 1,130,633 | Roller | Mar. 2, 1915 |
| 2,635,155 | Barr | Apr. 14, 1953 |
| 2,852,744 | Morrow et al. | Sept. 16, 1958 |